(No Model.)
W. L. STEWART.
BICYCLE BRAKE.
No. 575,938. Patented Jan. 26, 1897.
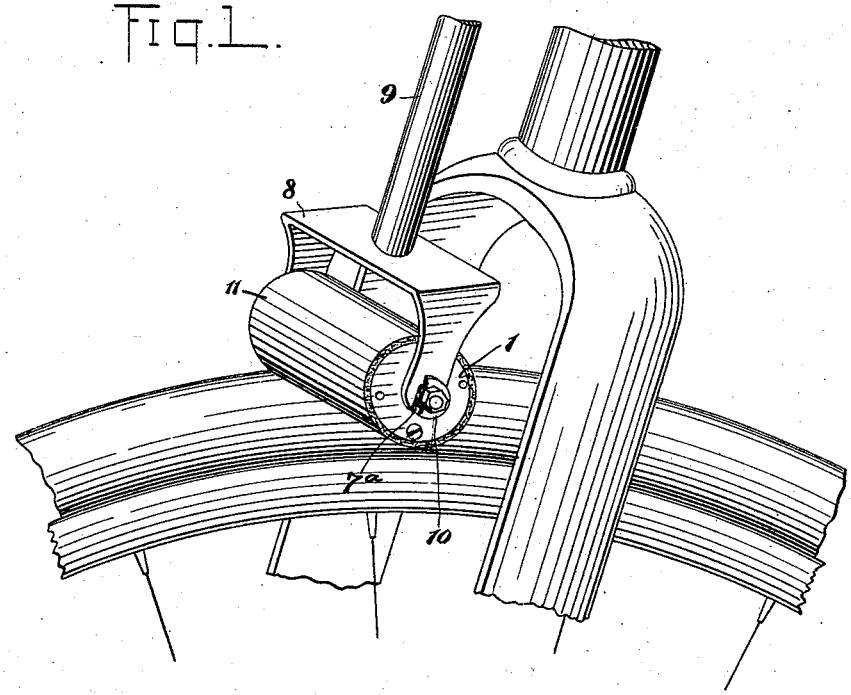
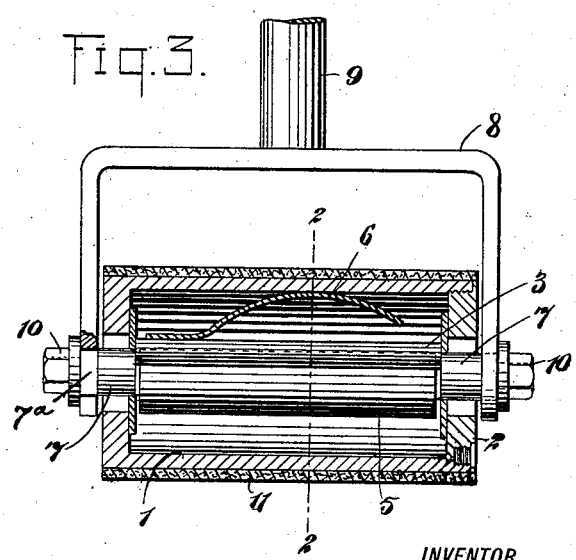

UNITED STATES PATENT OFFICE.

WILLIAM L. STEWART, OF WILMERDING, PENNSYLVANIA.

BICYCLE-BRAKE.

SPECIFICATION forming part of Letters Patent No. 575,938, dated January 26, 1897.

Application filed July 18, 1896. Serial No. 599,603. (No model.)

*To all whom it may concern:*

Be it known that I, WILLIAM L. STEWART, of Wilmerding, in the county of Allegheny and State of Pennsylvania, have invented a new and Improved Bicycle-Brake, of which the following is a full, clear, and exact description.

This invention relates to improvements in brakes for bicycles and similar pneumatic-tired vehicles, and has for its object to provide a brake of a simple and comparatively inexpensive construction which shall be light and strong and adapted to generate sufficient friction against a wheel to stop or retard its rotation, without injury to the material of which the tire is formed.

I will describe a brake embodying my invention, and then point out the novel features in the appended claims.

Reference is to be had to the accompanying drawings, forming a part of this specification, in which similar characters of reference indicate corresponding parts in all the views.

Figure 1 is a perspective view of a brake embodying my invention, showing the same as applied to a bicycle-wheel. Fig. 2 is a section on the line 2 2 of Fig. 3, and Fig. 3 is a section substantially on the line 3 3 of Fig. 2.

The brake comprises a metal cylinder 1, here shown as closed at one of its ends, the opposite end 2 being removable. As here shown, this end 2 is provided with an exterior thread to engage an interior thread of the cylinder 1. The fixed end and the removable end are each provided with central openings for the passage of the trunnions of a bearing-block 3, arranged within the cylinder and extended longitudinally thereof. This bearing-block 3 extends transversely of the cylinder and has semicylindrical seats 4, extended longitudinally of it in its lower opposite sides. In each seat 4 is loosely mounted a friction-cylinder 5, which, for the purpose of securing lightness, I preferably make tubular, as indicated in the drawings. These friction-cylinders 5 engage against the inner periphery of the cylinder 1, slightly below its longitudinal center, and they are pressed yieldingly against the same by means of the spring 6, secured at one end to the block 3 and at its free end bearing against the upper side of the cylinder 1.

Each end of the bearing-block 3 is provided with a trunnion 7, extended outward through openings in the end pieces of the cylinder 1, and these extended ends are engaged by the downwardly-extended members of a yoke 8, to the central portion of which is attached the lower end of an upwardly-extended operating-rod 9. To prevent a rotary movement of the block 3 relatively to the yoke 8, I have here shown the ends of the trunnions as made angular, as at 7ª, and the ends of the yoke, sections have correspondingly-shaped slots formed in them to engage with these angular portions. At the outer side of the downwardly-extended members of the yoke the trunnions 7 may be screw-threaded and provided with nuts 10.

The operating-rod 9 will extend upward to a point adjacent to the handle-bar of the bicycle, where it may be provided with a suitable handle, the downward movement of which will move the brake-cylinder 1 into engagement with the tire of a wheel. Preferably the cylinder 1 will have a covering 11 of yielding material, for instance, canvas, and the said material may engage with sufficient friction against the tire to retard or stop the rotation of the wheel, without injury to said tire. It will be seen that the openings through the ends of the cylinder 1 are slightly larger in diameter than the trunnion 7, and therefore there is a slight play between the brake-cylinder 1 and the friction cylinders or rollers 5.

In operation when it is desired to use the brake the rider will force the cylinder 1 into engagement with the tire. At the same time the friction cylinders or rollers 5 will be pressed into frictional engagement with the interior of said chamber. The braking force upon the wheel will be of course proportionate to the force or pressure between the friction cylinders or rollers 5 and the cylinder 1, and thus retard or wholly stop the rotation of the wheel.

From the above description it will be seen that the brake is of an extremely simple and comparatively inexpensive construction, and is well adapted for use on bicycles and similar pneumatic-tired vehicles, since the friction employed to retard the wheel is not applied directly to the vehicle-tire, but is applied to the interior of the brake-cylinder, which may rotate more or less by its frictional contact with the tire.

Having thus described my invention, I claim as new and desire to secure by Letters Patent—

1. A brake for bicycles or the like, comprising a brake-cylinder, a bearing-block extended longitudinally therein, friction-rollers supported in said block and engaging the inner surface of the brake-cylinder, a yoke engaging with trunnions extended from the ends of said block, and an operating-rod extended upward from said yoke, substantially as specified.

2. A brake for bicycles or the like, comprising a cylinder, a bearing-block arranged longitudinally therein and having semicylindrical seats formed in its lower side, friction cylinders or rollers in said seats, a spring attached to the upper side of said block and engaging its free end with the interior of the brake-cylinder, and a yoke having its downwardly-extended members engaged with trunnions extended from the said block through openings in the ends of the brake-cylinder, substantially as specified.

3. A brake for bicycles or the like, comprising a cylinder, a bearing-block arranged longitudinally therein and having transverse curved seats in its lower side, friction-rollers engaging in said seats and engaging the interior of the brake-cylinder, a spring for forcing said block and friction-rollers yieldingly downward with relation to the brake-cylinder, an operating-rod having engagement with trunnions extended from said bearing-block through openings in the end of the brake-cylinder, and a cover of yielding material on the brake-cylinder, substantially as specified.

4. A bicycle-brake, comprising a cylinder, a cover of yielding material on the outer side thereof, a bearing-block extended longitudinally in said cylinder and having trunnions extended outward through openings in the end of said cylinder, friction-rollers loosely mounted in transverse curved seats formed in the under side of said bearing-block, a yoke having its downwardly-extended members engaged with the trunnions, means for preventing a rotary motion of said block relatively to the yoke, and an operating-rod extended upward from said yoke, substantially as specified.

WILLIAM L. STEWART.

Witnesses:
GEORGE W. HOGE,
G. CLYDE THOMPSON.